(12) United States Patent
Rhyu et al.

(10) Patent No.: US 11,887,342 B2
(45) Date of Patent: Jan. 30, 2024

(54) METHOD AND DEVICE FOR ENCODING THREE-DIMENSIONAL IMAGE, AND METHOD AND DEVICE FOR DECODING THREE-DIMENSIONAL IMAGE

(71) Applicants: Samsung Electronics Co., Ltd., Suwon-si (KR); UNIVERSITY-INDUSTRY COOPERATION GROUP OF KYUNG HEE UNIVERSITY, Yongin-si (KR)

(72) Inventors: Sungryeul Rhyu, Suwon-si (KR); Jiheon Im, Yongin-si (KR); Junsik Kim, Yongin-si (KR); Kyuheon Kim, Yongin-si (KR); Youngho Oh, Suwon-si (KR); Jihwan Woo, Suwon-si (KR)

(73) Assignees: Samsung Electronics Co., Ltd., Suwon-si (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 405 days.

(21) Appl. No.: 17/275,457

(22) PCT Filed: Oct. 4, 2019

(86) PCT No.: PCT/KR2019/013023
§ 371 (c)(1),
(2) Date: Mar. 11, 2021

(87) PCT Pub. No.: WO2020/071845
PCT Pub. Date: Apr. 9, 2020

(65) Prior Publication Data
US 2022/0051446 A1 Feb. 17, 2022

(30) Foreign Application Priority Data

Oct. 5, 2018 (KR) ........................ 10-2018-0119324

(51) Int. Cl.
*G06T 3/40* (2006.01)
*G06T 9/00* (2006.01)
*G06T 3/00* (2006.01)

(52) U.S. Cl.
CPC ............ *G06T 9/001* (2013.01); *G06T 3/0031* (2013.01); *G06T 3/40* (2013.01)

(58) Field of Classification Search
CPC .......... G06T 9/001; G06T 3/0031; G06T 3/40
See application file for complete search history.

(56) References Cited

U.S. PATENT DOCUMENTS 9,251,399 B2   2/2016   Hwang et al.
9,633,483 B1   4/2017   Xu et al.
(Continued)

FOREIGN PATENT DOCUMENTS

KR   10-2013-0021018 A   3/2013

OTHER PUBLICATIONS

Kimmo Roimela et al., "Per-patch sampling resolution signaling for PCC TMC2", (Apr. 6, 2018), XP030070810.
(Continued)

*Primary Examiner* — Syed Haider
(74) *Attorney, Agent, or Firm* — Jefferson IP Law, LLP

(57) ABSTRACT

The present disclosure relates to a method of encoding a three-dimensional image including a point cloud. According to an embodiment of the present disclosure, a method of encoding a three-dimensional image may include determining a spatial area in a three-dimensional space represented by the point cloud, projecting, onto a two-dimensional plane, a plurality of points included in the point cloud to
(Continued)

generate a plurality of patches, determining at least one patch corresponding to the determined spatial area, down-sampling at least one patch according to a predefined rule, generating a two-dimensional image by packing the at least one down-sampled patch and the plurality of patches corresponding to areas other than the determined spatial area, and generating and outputting a bitstream including data in which the two-dimensional image is compressed and information related to the down-sampling performed to generate the two-dimensional image.

16 Claims, 18 Drawing Sheets

(56) References Cited

U.S. PATENT DOCUMENTS

| 2014/0177706 A1* | 6/2014 | Fernandes | H04N 19/59 |
| | | | 375/240.03 |
| 2016/0086353 A1 | 3/2016 | Lukac et al. | |
| 2018/0218510 A1 | 8/2018 | Taguchi et al. | |
| 2018/0268570 A1 | 9/2018 | Budagavi et al. | |
| 2019/0087978 A1* | 3/2019 | Tourapis | G06T 9/00 |
| 2019/0318519 A1* | 10/2019 | Graziosi | G06T 15/20 |

OTHER PUBLICATIONS

Kimmo R0imela et al., "CE 2.10:Integration of m42470 and m42471", (Jul. 9, 2018), XP030196312.

Anonymous: "Algorithm description of mpeg-pcc-tmc2 (v-pcc)", 123. MPEG Meeting, (Oct. 2, 2018), pp. 1-22, XP030191777.

Juntaek Park et al., "Non-overlapping Patch Packing in TMC2 with HEVC-SCC", (Jul. 17, 2018), XP030197463.

Extended European Search Report dated Oct. 1, 2021, issued in European Patent Application No. 19868373.2-1230.

International Search Report dated Jan. 17, 2020, issued in International Patent Application No. PCT/KR2019/013023.

* cited by examiner

FIG. 11A

```
<MPD xmlns="urn:mpeg:dash:schema:mpd:2011" minBufferTime="PT1.500S" type="static"
mediaPresentationDuration="PT0H0M40.000S" maxSegmentDuration="PT0H0M10.000S"
profiles="urn:mpeg:dash:profile:isoff-live:2011">
  <Period duration="PT0H0M40.000S">
    <AdaptationSet segmentAlignment="true" bitstreamSwitching="true" maxWidth="1920"
maxHeight="1080" maxDepth="1080" maxFrameRate="25000/998" par="16:9" lang="und">
      <EssentialProperty schemeIdUri="urn:mpeg:dash:srd:2014" value="1,0,0,0,0,0,0"/>
      <SegmentTemplate initialization="hevc_set1_init.mp4"/>
      <Representation id="1" mimeType="video/mp4" codecs="hev2.1.6.L186.0" width="1920" height="1080"
frameRate="25" sar="1:1" startWithSAP="3" bandwidth="15273">
        <SegmentTemplate timescale="25000" media="op22_dash_track1_$Number$.m4s" startNumber="1"
duration="250000"/>
      </Representation>
    </AdaptationSet>
    <AdaptationSet segmentAlignment="true" bitstreamSwitching="true" maxWidth="640" maxHeight="320"
maxDepth="320" maxFrameRate="25000/998" par="2:1" lang="und">
      <SupplementalProperty schemeIdUri="urn:mpeg:dash:srd:2014" value="1,0,0,0,640,320,320"/>
      <Representation id="1_20" mimeType="video/mp4" codecs="hvt1.1.6.L186.0" width="640" height="320"
depth="320" frameRate="25" sar="1:1" startWithSAP="3" bandwidth="808733" dependencyId="1"
```

FIG. 11B

```
levelofdetail="4">
        <SegmentTemplate timescale="25000" media="qp22_dash_track2_$Number$.m4s" startNumber="1"
duration="250000"/>
    </Representation>
    <Representation id="1_21" mimeType="video/mp4" codecs="hvt1.1.6.L186.0" width="640" height="320"
depth="320" frameRate="25" sar="1:1" startWithSAP="3" bandwidth="148708" dependencyId="1"
levelofdetail="2">
        <SegmentTemplate timescale="25000" media="qp22_dash_track2_$Number$.m4s" startNumber="1"
duration="250000"/>
    </Representation>
    <Representation id="1_22" mimeType="video/mp4" codecs="hvt1.1.6.L186.0" width="640" height="320"
depth="320" frameRate="25" sar="1:1" startWithSAP="3" bandwidth="61964" dependencyId="1"
levelofdetail="4">
        <SegmentTemplate timescale="25000" media="qp27_dash_track2_$Number$.m4s" startNumber="1"
```

FIG. 11C

```
duration="250000"/>
    </Representation>
    <Representation id="1_23" mimeType="video/mp4" codecs="hvt1.1.6.L186.0" width="640" height="320" depth="320" frameRate="25" sar="1:1" startWithSAP="3" bandwidth="35331" dependencyId="1" levelofdetail="2">
        <SegmentTemplate timescale="25000" media="qp27_dash_track2_$Number$.m4s" startNumber="1" duration="250000"/>
    </Representation>
</AdaptationSet>
<AdaptationSet segmentAlignment="true" bitstreamSwitching="true" maxWidth="640" maxHeight="320" maxDepth="320" maxFrameRate="25000/998" par="2:1" lang="und">
    <SupplementalProperty schemeIdUri="urn:mpeg:dash:srd:2014" value="1,320,0,0,640,320,320"/>
    <Representation id="1_30" mimeType="video/mp4" codecs="hvt1.1.6.L186.0" width="640" height="320" depth="320" frameRate="25" sar="1:1" startWithSAP="3" bandwidth="1765788" dependencyId="1" levelofdetail="4">
        <SegmentTemplate timescale="25000" media="qp22_dash_track3_$Number$.m4s" startNumber="1" duration="250000"/>
    </Representation>
    <Representation id="1_31" mimeType="video/mp4" codecs="hvt1.1.6.L186.0" width="640" height="320" depth="320" frameRate="25" sar="1:1" startWithSAP="3" bandwidth="331761" dependencyId="1"
```

FIG. 11D

```
levelofdetail="2">
        <SegmentTemplate timescale="25000" media="qp22_dash_track3_$Number$.m4s" startNumber="1"
duration="250000"/>
        </Representation>
        <Representation id="1_32" mimeType="video/mp4" codecs="hvt1.1.6.L186.0" width="640" height="320"
depth="320" frameRate="25" sar="1:1" startWithSAP="3" bandwidth="110434" dependencyId="1"
levelofdetail="4">
        <SegmentTemplate timescale="25000" media="qp27_dash_track3_$Number$.m4s" startNumber="1"
duration="250000"/>
        </Representation>
        <Representation id="1_33" mimeType="video/mp4" codecs="hvt1.1.6.L186.0" width="640" height="320"
depth="320" frameRate="25" sar="1:1" startWithSAP="3" bandwidth="54053" dependencyId="1"
levelofdetail="2">
        <SegmentTemplate timescale="25000" media="qp27_dash_track3_$Number$.m4s" startNumber="1"
duration="250000"/>
        </Representation>
        <!--...-->
    </AdaptationSet>
    <!--...-->
  </Period>
</MPD>
```

METHOD AND DEVICE FOR ENCODING THREE-DIMENSIONAL IMAGE, AND METHOD AND DEVICE FOR DECODING THREE-DIMENSIONAL IMAGE

CROSS-REFERENCE TO RELATED APPLICATION(S)

This application is a U.S. National Stage application under 35 U.S.C. § 371 of an International application number PCT/KR2019/013023, filed on Oct. 4, 2019, which is based on and claims the benefit priority of a Korean patent application number 10-2018-0119324, filed on Oct. 5, 2018, in the Korean Intellectual Property Office, the disclosure of which is incorporated by reference herein in its entirety.

TECHNICAL FIELD

The present disclosure relates to a method and a device for processing a three-dimensional image.

BACKGROUND ART

A point cloud refers to a set of a large amount of points, and a large-volume three-dimensional image may be represented by a point cloud. The point cloud is for expressing a point in a three-dimensional space by using values different from those used in a two-dimensional image, in the form of a vector that simultaneously contains position coordinates and colors of a point. For example, a point of the point cloud may be represented by (x, y, z, R, G, B). A significantly large amount of color and position data constitutes a spatial configuration of the point cloud, and as its density increases, the point cloud becomes more detailed with respect to data and more meaningful as a three-dimensional model.

Because a point cloud expressing a three-dimensional image requires a considerable amount of memory and processor resources, a method of compressing a point cloud is demanded to transmit the point cloud. Therefore, a method of efficiently compressing a three-dimensional image is required. Furthermore, a method of processing a three-dimensional image is required.

DESCRIPTION OF EMBODIMENTS

Technical Problem

The present disclosure provides a method and a device for efficiently processing a three-dimensional image. More specifically, the present disclosure provides a method and a device for efficiently compressing a three-dimensional image, and a method and a device for reconstructing a three-dimensional image by processing the compressed and transmitted three-dimensional image.

Solution to Problem

According to an aspect of the present disclosure, there is provided a method of encoding a three-dimensional image including a point cloud, the method including determining a spatial area in a three-dimensional space represented by the point cloud, projecting, onto a two-dimensional plane, a plurality of points included in the point cloud to generate a plurality of patches, determining at least one patch corresponding to the determined spatial area, down-sampling at least one patch according to a predefined rule, generating a two-dimensional image by packing the at least one down-sampled patch and the plurality of patches corresponding to areas other than the determined spatial area, and generating and outputting a bitstream including data in which the two-dimensional image is compressed and information related to the down-sampling performed to generate the two-dimensional image.

Advantageous Effects of Disclosure

According to the present disclosure, the amount of data that is transmitted may be reduced by efficiently compressing and transmitting a three-dimensional image. Accordingly, resource consumption may be reduced, and required storage capacity, transmission time, hardware costs, or the like may also be reduced.

The effects that may be obtained by the present disclosure are not limited to the above-mentioned effects, and other effects that are not mentioned herein may be clearly understood by one of skill in the art from the following description.

BRIEF DESCRIPTION OF DRAWINGS

FIG. 11A is a diagram of a part of an example of a manifest, according to an embodiment of the present disclosure.

FIG. 11B is a diagram of a part of an example of a manifest, according to an embodiment of the present disclosure.

FIG. 11C is a diagram of a part of an example of a manifest, according to an embodiment of the present disclosure.

FIG. 11D is a diagram of a part of an example of a manifest, according to an embodiment of the present disclosure.

BEST MODE

Figure 1:
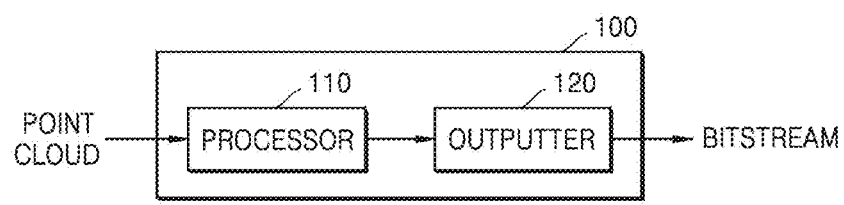
FIG. 1 is a block diagram of a three-dimensional image encoding device for encoding a three-dimensional image, according to an embodiment of the present disclosure.

According to an embodiment of the present disclosure, a method of encoding a three-dimensional image including a point cloud may include determining a spatial area in a three-dimensional space represented by the point cloud, projecting, onto a two-dimensional plane, a plurality of points included in the point cloud to generate a plurality of patches, determining at least one patch corresponding to the determined spatial area, down-sampling at least one patch according to a predefined rule, generating a two-dimensional image by packing the at least one down-sampled patch and the plurality of patches corresponding to areas other than the determined spatial area, and generating and outputting a bitstream including data in which the two-dimensional image is compressed and information related to the down-sampling performed to generate the two-dimensional image.

According to an embodiment of the present disclosure, a device for encoding a three-dimensional image may include at least one processor configured to determine a spatial area in a three-dimensional space represented by the point cloud, project, onto a two-dimensional plane, a plurality of points included in the point cloud to generate a plurality of patches, determine at least one patch corresponding to the determined spatial area, down-sample at least one patch according to a predefined rule, generate a two-dimensional image by packing the at least one down-sampled patch and the plurality of patches corresponding to areas other than the determined spatial area, and generate a bitstream including data in which the two-dimensional image is compressed and information related to the down-sampling performed to generate the two-dimensional image, and an outputter configured to output the bitstream.

According to an embodiment of the present disclosure, a method of decoding a three-dimensional image including a point cloud may include receiving a bitstream, obtaining, from the bitstream, information related to down-sampling and data in which a two-dimensional image is compressed, up-scaling at least one down-sampled patch included in the two-dimensional image, based on the information related to the down-sampling, and reconstructing the point cloud by restoring color information and position information of points, based on the up-scaled two-dimensional image.

According to an embodiment of the present disclosure, a device for decoding a three-dimensional image may include a receiver configured to receive a bitstream, and at least one processor configured to obtain, from the bitstream, information related to down-sampling and data in which a two-dimensional image is compressed, up-scale at least one down-sampled patch included in the two-dimensional image based on the information related to the down-sampling, and reconstruct the point cloud by restoring color information and position information of points based on the up-scaled two-dimensional image.

MODE OF DISCLOSURE

The terms used in various embodiments of the present disclosure are used only to describe a specific embodiment of the present disclosure, and are not intended to limit the various embodiments of the present disclosure. A singular expression may include a plural expression unless they are definitely different in a context.

Throughout the specification, reference to "an embodiment" or "embodiment" means that a particular feature, structure, or characteristic described in connection with the embodiment is included in at least one embodiment of the present disclosure. Thus, appearances of the phrases "in an embodiment" in various places throughout the specification are not necessarily referring to the same embodiment.

Unless otherwise defined, all terms, including technical and scientific terms, used herein have the same meaning as commonly understood by one of skill in the art to which the present disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Some embodiments of the present disclosure may be represented by functional block components and various processing operations. Some or all of the functional blocks may be implemented with various numbers of hardware and/or software components configured to perform specified functions. For example, the functional blocks of the present disclosure may be embodied by at least one microprocessor or by circuit components for a certain function. Also, for example, the functional blocks of the present disclosure may be implemented by using various programming or scripting languages. The functional blocks may be implemented with algorithms executed in at least one processor. Further, the present disclosure may employ the related art for electronic configuration, signal processing, and/or data processing.

Also, connection lines or connection members between components shown in the drawings are merely illustrative of functional connections and/or physical or circuit connections. In an actual device, connections between components may be represented by various functional connections, physical connections, or circuit connections that may be replaced or added.

The term "image" used throughout the present specification is an inclusive term to denote various forms of video or image information that may be known in the related art, such as a "picture", a "frame", a "field", or a "slice". Also, the term "image" may include both a two-dimensional frame and a three-dimensional frame. For example, the term "image" may mean one of a plurality of pictures or a plurality of frames constituting video stream or mean a whole video stream including a plurality of pictures or a plurality of frames. Also, the term "image" may include a three-dimensional frame represented by a point cloud.

Throughout the specification, when a part "includes" or "comprises" an element, unless there is a particular description contrary thereto, the part can further include other elements, not excluding the other elements. Furthermore, as used herein, the term "unit" denotes a software element or a hardware element such as a field-programmable gate array (FPGA) or an application-specific integrated circuit (ASIC), and performs certain functions. However, the term "unit" is not limited to software or hardware. The "unit" may be formed so as to be in an addressable storage medium, or may be formed so as to operate one or more processors. Thus, for example, the term "unit" may include elements such as software elements, object-oriented software elements, class elements and task elements, processes, functions, attributes, procedures, subroutines, segments of program code, drivers, firmware, micro-code, circuits, data, a database, data structures, tables, arrays, or variables. Functions provided by the elements and "units" may be combined into the smaller number of elements and "units", or may be divided into additional elements and "units".

Hereinafter, the present disclosure will be described in detail with reference to the accompanying drawings.

A two-dimensional image may be represented by a set of pixels having color values or depth values. A three-dimensional image may be represented by a set of voxels having color values. Image data represented by a set of points (or voxels) having color values in a three-dimensional space is referred to as a point cloud. Because the point cloud includes information of elements in a three-dimensional space, the point cloud is constructed with higher dimensional vectors and contains a larger amount of data, compared to a two-dimensional image. Therefore, active research on high-efficiency compression technology is being carried out, so as to provide a point cloud to a user in a rapid, accurate, and efficient manner.

Point cloud compression technology may be classified into various categories according to characteristics of data. Various compression techniques include a method of converting a point cloud into a two-dimensional image and compressing the converted two-dimensional image by using a conventional video compression scheme (e.g., HEVC).

FIG. 1 is a block diagram of a three-dimensional image encoding device 100 for encoding a three-dimensional image, according to an embodiment of the present disclosure.

According to an embodiment of the present disclosure, the three-dimensional image encoding device 100 may include a processor 110 and an outputter 120. The three-dimensional image encoding device 100 may encode a three-dimensional image by converting the three-dimensional image including a point cloud into a two-dimensional image and compressing the two-dimensional image.

The processor 110 may determine a spatial area in a three-dimensional space based on the point cloud transmitted to the three-dimensional image encoding device 100. Here, the spatial area determined by the processor 110 may correspond to an area in the three-dimensional space selected by a user. The user may select an area in the three-dimensional space that has been determined, by the user, to be less important, and the processor 110 may determine the spatial area according to the user's selection. According to another embodiment of the present disclosure, when the user selects the area in the three-dimensional space determined to be less important, the remaining areas other than the area selected by the user may be determined as the spatial area for down-sampling.

The processor 110 may divide, without the user's selection, the three-dimensional space into unit areas having the same size, and may make a specific area from among the unit areas correspond to at least one patch to be down-sampled. In addition, the spatial area determined by the processor 110 may be an entire area of the three-dimensional space. A plurality of patches may be generated by projecting, onto a two-dimensional plane, a plurality of points included in the point cloud. The generation of the plurality of patches by the projection will be described in detail with reference to FIGS. 3 and 4.

The processor 110 may determine at least one patch corresponding to the determined spatial area from among the plurality of patches, and then down-sample the at least one patch based on a predefined rule. The down-sampling may refer to preservation of one or more points from among a plurality of points existing in the at least one patch. According to an embodiment of the present disclosure, the processor 110 may divide the at least one patch into blocks having a preset size, and preserve, when a point exists at a predefined position in each block, the point, thereby down-sampling the at least one patch. The down-sampling of the at least one patch will be described in detail with reference to FIGS. 7 to 9.

The processor 110 may generate a two-dimensional image by packing the at least one down-sampled patch corresponding to the determined spatial area and patches corresponding to the remaining areas other than the determined spatial area. The processor 110 may also compress the generated two-dimensional image by using a conventional video compression scheme.

The compressed two-dimensional image may be output in a form of a bitstream through the outputter 120. According to an embodiment of the present disclosure, a bitstream being output may include data in which the two-dimensional image is compressed and information related to the down-sampling. Also, because the two-dimensional image is compressed by using the conventional video compression scheme, the bitstream being output may include other attribute information related to encoding.

Figure 2:
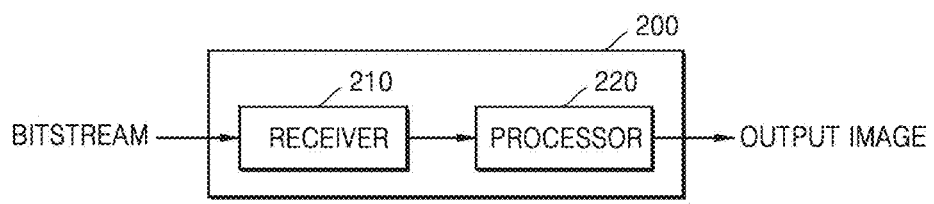
FIG. 2 is a block diagram of a three-dimensional image decoding device for decoding a three-dimensional image, according to an embodiment of the present disclosure.

FIG. 2 is a block diagram of the three-dimensional image decoding device 200 for decoding a three-dimensional image, according to an embodiment of the present disclosure.

According to an embodiment of the present disclosure, the three-dimensional image decoding device 200 may include a receiver 210 and a processor 220.

The three-dimensional image encoding device 100 and the three-dimensional image decoding device 200 may be connected to each other via a network, such that the receiver 210 may receive the bitstream output by the outputter 120. Throughout the present disclosure, the network may include a wired network or a wireless network.

According to an embodiment of the present disclosure, the receiver 210 may receive and parse the bitstream output from the three-dimensional image encoding device 100, and the processor 220 may analyze information obtained by parsing, by the receiver 210, the bitstream.

According to an embodiment of the present disclosure, the processor 220 may obtain, from the bitstream, the information related to the down-sampling and the data in which the two-dimensional image is compressed, and may up-scale at least one patch included in the two-dimensional image based on the information related to the down-sampling. Throughout the present disclosure, the up-scaling is a concept opposite to the down-sampling, and the processor 220 may perform the up-scaling by indexing points in the at least one down-sampled patch received by the receiver 210, into a patch that is enlarged at a preset ratio.

Then, the processor 220 may reconstruct the point cloud by restoring color information and position information of the points based on the up-scaled two-dimensional image.

The point cloud reconstructed by the processor 220 may be converted into a three-dimensional image to be displayed to a user.

Although the three-dimensional image encoding device 100 and the three-dimensional image decoding device 200 according to embodiments of FIGS. 1 and 2 are illustrated as each including one processor 120 or 220, the present disclosure is not limited thereto. Accordingly, the three-dimensional image encoding device 100 and the three-dimensional image decoding device 200 may include a plurality of processors, and operations described below may be all performed by the one processor or may be partially performed by the plurality of processors.

Figure 3:
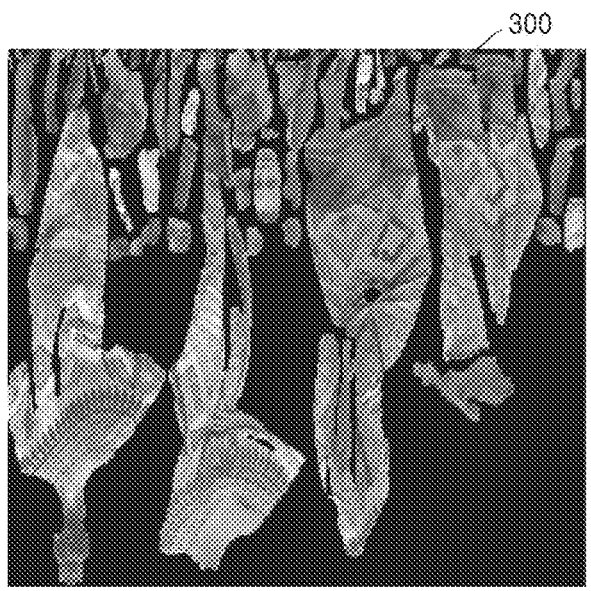
FIG. 3 is a diagram of a two-dimensional image generated by projecting a point cloud onto a plane, according to an embodiment of the present disclosure.

FIG. 3 is a diagram of a two-dimensional image generated by projecting a point cloud onto a plane, according to an embodiment of the present disclosure.

Throughout the present disclosure, the three-dimensional image may refer to an object (not shown) in a three-dimensional space. In addition, the object may be included in any one of a plurality of three-dimensional frames.

The three-dimensional image encoding device 100 may generate the plurality of patches by projecting grouped points onto the two-dimensional plane. Here, the three-dimensional image encoding device 100 may generate a geometry image and a texture image by classifying high-similarity patches, and collecting and packing the classified patches. Throughout the present disclosure, the geometry image may refer to position information of the plurality of points included in the point cloud, and the texture image may refer to color information of the plurality of points included in the point cloud.

The plurality of points included in the point cloud may be grouped based on at least one of a normal vector of each point, a position of each point, or a color of each point. The normal vector is a vector that exists in a two-dimensional plane and is parallel to a normal axis to a certain point existing in a three-dimensional space. The normal axis may be an axis perpendicular to the two-dimensional plane onto which the three-dimensional image is projected.

According to an embodiment of the present disclosure, points having the same or similar normal vectors may be grouped into one segment. For example, a plurality of points may be grouped to constitute a plurality of segments. The three-dimensional image encoding device 100 may generate the plurality of patches by projecting points included in a plurality of segments onto the two-dimensional plane. For example, when similarities between the normal vectors are greater than or equal to a preset threshold value, the normal vectors may be determined to be similar to each other. According to another embodiment of the present disclosure, adjacent points that are separated from each other by distances equal to or less than a preset value may be grouped into one segment. In addition, in the configuration of the segments, when the similarities between the normal vectors of the points are low or the distances between the points are greater than or equal to a preset value, but the colors of the points are identical or similar to each other, the points may be grouped into the same segment.

The three-dimensional image encoding device 100 may also use a preset surface thickness value for the projection. The surface thickness value may be a distance difference between a first point and a second point which are spaced apart from the two-dimensional plane onto which the projection is performed by a certain distance along a direction of the normal axis. The three-dimensional image encoding device 100 may perform the projection with respect to only points within the preset surface thickness value, based on a point closest to the plane in the direction of the normal axis.

When the point cloud represents information about the object, information about surfaces exposed outside the object may be important information, and information about an inside of the object may be relatively less important information. Accordingly, the three-dimensional image encoding device 100 of FIG. 1 may project, on the plane, only points near the surface of the object, when projecting the plurality of points of the point cloud.

According to an embodiment of the present disclosure, the three-dimensional image encoding device 100 may generate a D0 image (a position information image) by projecting the points on the surface of the object. For example, the D0 image (an on-plane position information image) may be generated by collecting patches representing depth values of points on the surface of the object.

According to an embodiment of the present disclosure, the three-dimensional image encoding device 100 may generate a D1 image (a depth information image) by projecting a plurality of points having the greatest depth value equal to or less than the preset surface thickness value, based on a plurality of points closest to the plane in the direction of the normal axis. For example, the D1 image (the depth information image) may be generated by collecting patches containing the plurality of points having the greatest depth value equal to or less than the preset surface thickness value, based on a plurality of points closest to the plane in the direction of the normal axis.

According to an embodiment of the present disclosure, the three-dimensional image encoding device 100 may generate a T0 image by collecting the color information of the points related to the surface of the object, and may generate a T1 image by collecting the color information of the points having the greatest depth value equal to or less than the preset surface thickness value. Accordingly, the T0 image may correspond to the D0 image, and the T1 image may correspond to the D1 image.

A two-dimensional image 300 of FIG. 3 is an example of the texture image representing the color values of the points included in the point cloud. Accordingly, the two-dimensional image 300 may be a T0 image or a T1 image described above.

Figure 4:
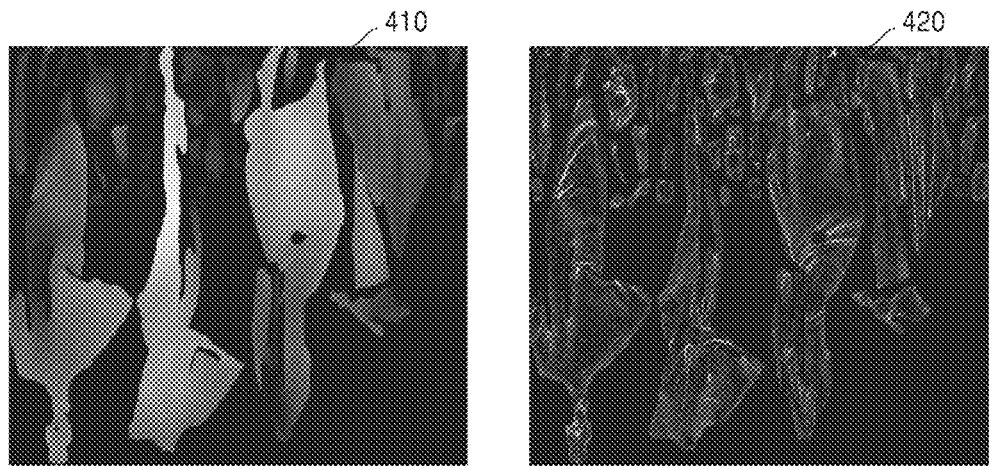
FIG. 4 is a diagram of two-dimensional images generated by projecting a point cloud onto a plane, according to an embodiment of the present disclosure.

FIG. 4 is a diagram of two-dimensional images generated by projecting a point cloud onto a plane, according to an embodiment of the present disclosure.

The two-dimensional images 410 and 420 of FIG. 4 are examples of the geometry image representing three-dimensional position information of the points included in the point cloud. The two-dimensional image 410 may correspond to the D0 image, and the two-dimensional image 420 may correspond to the D1 image.

Figure 5:
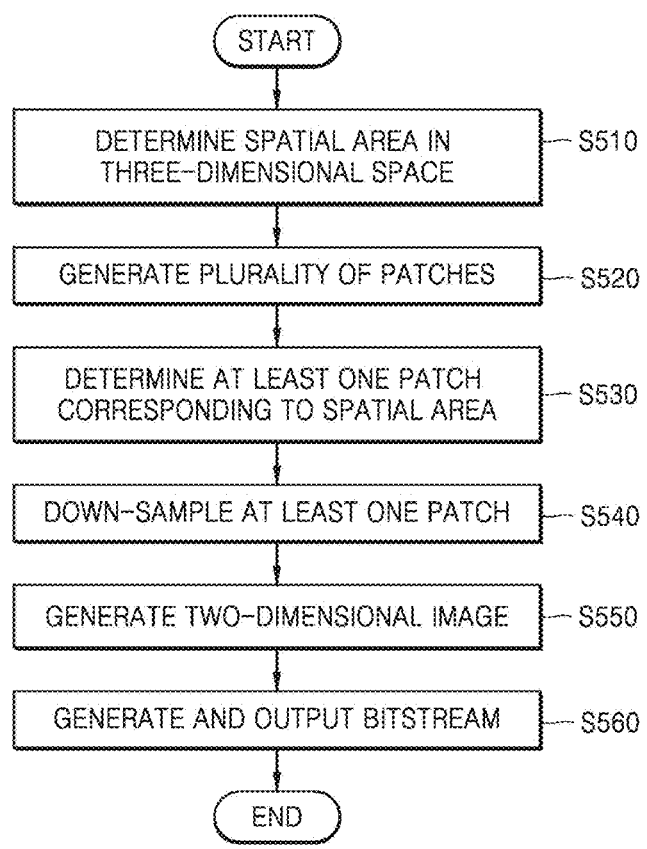
FIG. 5 is a flowchart of a method of encoding and transmitting a three-dimensional image, according to an embodiment of the present disclosure.

FIG. 5 is a flowchart of a method of encoding and transmitting a three-dimensional image, according to an embodiment of the present disclosure.

In operation S510, the three-dimensional image encoding device 100 may determine the spatial area in the three-dimensional space. The spatial area determined by the processor 110 may correspond to the area in the three-dimensional space selected by the user. For example, the user may select an area of the object (not shown) in the three-dimensional space that has been determined, by the user, to be less important. The three-dimensional image encoding device 100 may receive a user input to determine the spatial area selected by the user. However, the determined spatial area of the present disclosure is not limited to a spatial area selected by a user. The three-dimensional image encoding device 100 may determine, without user selection, the spatial area to be a certain area or the entire area of the three-dimensional image.

In operation S520, the three-dimensional image encoding device 100 may generate the plurality of patches by projecting, onto the two-dimensional plane, the plurality of points included in the point cloud. The generation of the plurality of patches has been described with reference to FIGS. 3 and 4, and thus a detailed description thereof will be omitted.

Next, in operation S530, the three-dimensional image encoding device 100 may determine the at least one patch corresponding to the determined spatial area in the three-dimensional space from among the plurality of patches generated by the projection.

Figure 6:
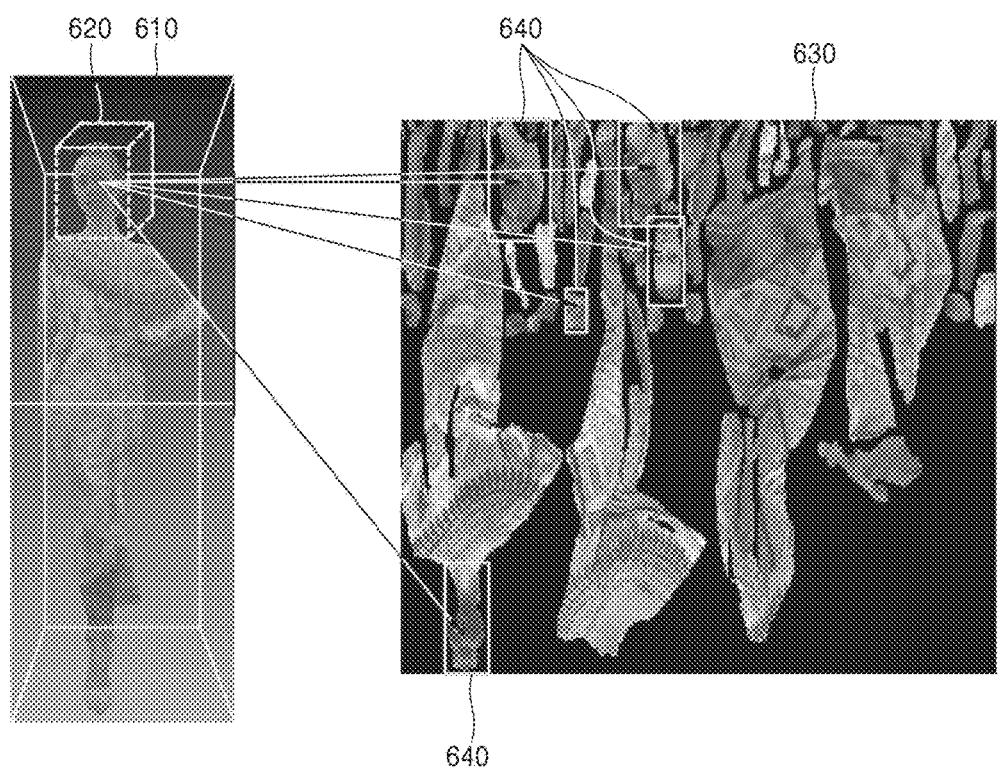
FIG. 6 is a diagram for explaining correspondences between a determined spatial area in a three-dimensional image and patches in a two-dimensional image, according to an embodiment of the present disclosure.

FIG. 6 is a diagram for explaining correspondences between the determined spatial area in the three-dimensional image and the patches in the two-dimensional image, according to an embodiment of the present disclosure.

The two-dimensional image 630 of FIG. 6 may be a texture image generated by projecting the point cloud onto the plane. Accordingly, the two-dimensional image 630 may correspond to the two-dimensional image 300 of FIG. 3. However, the present disclosure is not limited thereto. Accordingly, the two-dimensional image 630 may be a geometry image or a texture image.

According to an embodiment of the present disclosure, the three-dimensional image encoding device 100 may determine a patch corresponding to the spatial area 620 from among the plurality of patches of the two-dimensional image 630. The three-dimensional image encoding device 100 may generate the two-dimensional image 630 based on at least one of the normal vector or a position of each point. Accordingly, the plurality of points of the two-dimensional image 630 may correspond to values for the plurality of points of the three-dimensional image 610, and the three-dimensional image encoding device 100 may determine the patch corresponding to the spatial area 620 from among the plurality of patches of the two-dimensional image 630. For example, the three-dimensional image encoding device 100 may determine that at least one patch 640 from among the patches of the two-dimensional image 630 corresponds to the spatial area 620.

Referring back to FIG. 5, in operation S540, the three-dimensional image encoding device 100 may down-sample the at least one patch 640 according to the predefined rule. As the down-sampling of the present disclosure is performed, an amount of data transmission may be reduced with a three-dimensional image compression and transmission scheme. Accordingly, a resource consumption may be reduced, and a required storage capacity, transmission time, hardware costs, or the like may also be reduced. The down-sampling of the at least one patch will be described in detail with reference to FIGS. 7 to 9.

Next, in operation S550, the three-dimensional image encoding device 100 may generate the two-dimensional image by packing the at least one down-sampled patch and the plurality of patches of the two-dimensional image 630 corresponding to the remaining areas other than the determined spatial area in the space of the three-dimensional image 610. Here, the three-dimensional image encoding device 100 may generate the two-dimensional image by classifying the high-similarity patches and collecting and packing the classified patches.

Upon completion of the generation of the two-dimensional image, in operation S560, the three-dimensional image encoding device 100 may compress the two-dimensional image, and then generate and output the bitstream including compressed data and the information related to the down-sampling performed to generate the two-dimensional image. Here, the compression of the two-dimensional image may be performed by using a conventional video compression scheme (e.g., HEVC). Furthermore, the information related to the down-sampling included in the bitstream may include at least one of a size of the blocks into which the at least one patch is divided, the predefined rule, or the position information of the at least one down-sampled patch in the two-dimensional image. The position information may be a value for identifying the at least one down-sampled patch from among the plurality of patches in the two-dimensional image. For example, the position information may include at least one of coordinate values of a leftmost and uppermost point in the down-sampled patch, or a size value of the down-sampled patch.

Also, the bitstream may include information about the geometry image, the texture image, an occupancy map, and auxiliary data, and the information related to the down-sampling may be included in the auxiliary data.

Figure 7:
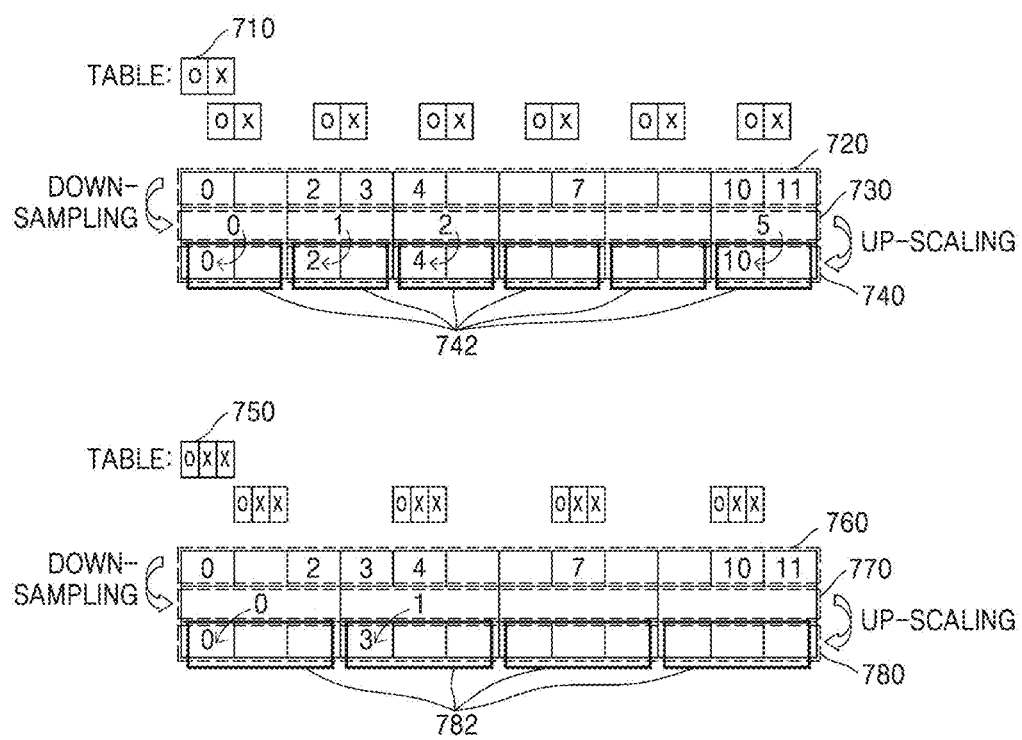
FIG. 7 is a diagram for explaining a process of down-sampling and up-scaling a patch based on a predefined rule, according to an embodiment of the present disclosure.

FIG. 7 is a diagram for explaining a process of down-sampling and up-scaling a patch based on the predefined rule, according to an embodiment of the present disclosure.

Throughout the present disclosure, the predefined rule may be a table indicating the size of the blocks into which the at least one patch is divided, and indicating a preset position at which a point is preserved from the blocks. The three-dimensional image encoding device 100 may by divide the plurality of patches into the blocks having the preset size, and preserve the point at the preset position in each block, according to the table.

Hereinafter, a process of down-sampling and up-scaling a patch having a size of 1×12 points, according to the predefined rule (or the table) 710 will be described with reference to FIG. 7.

"0" in the tables 710 and 750 may mean that a point at the corresponding cell is to be preserved, and "x" in the tables 710 and 750 may mean that a point at the corresponding cell is not to be preserved. For example, according to the table 710, the plurality of patches may be divided into blocks each having a size of 1×2 points, and only a point in a left cell among two cells in each block may be preserved. The patch 720 may be any one patch corresponding to the determined spatial area from among the plurality of patches generated by the projection. The patch 720 may have a size of 1×12 points. Here, cells filled with their indices "0", "2", "3", "4", "7", "10", and "11" in the patch 720 may indicate the points included in the patch 720. Accordingly, in the down-sampling of the patch 720 according to the table 710, the patch 720 may be divided into six blocks and the point in the left cell in each block may be preserved. Because the points exist at the cells with indices 0, 2, 3, 4, 7, 10, and 11 in the patch 720, only the points at the cells with indices 0, 2, 4, and 10 may be preserved after the down-sampling, according to the table 710.

In the down-sampling of the patch 720, the three-dimensional image encoding device 100 may generate a down-sampled patch 730, and may determine that points exist only at cells with indices 0, 1, 2, and 5 in the down-sampled patch 730. Here, because the down-sampled patch 730 is a result of the down-sampling of the patch 720, the down-sampled patch 730 may have a size of 1×6 points that is half of the size of the patch 720. As shown in FIG. 7, the three-dimensional encoding device 100 according to an embodiment of the present disclosure may reduce a number of points included in a patch by down-sampling the patch according to the predefined rule, and accordingly, may reduce a density of the spatial area of the three-dimensional space corresponding to the patch. Accordingly, the predefined rule may be referred to as a density control table. The three-dimensional image encoding device 100 may generate a down-sampled two-dimensional image by packing the down-sampled patch 730, and compress and output the generated two-dimensional image.

According to an embodiment of the present disclosure, the three-dimensional image decoding device 200 may receive the bitstream output by the three-dimensional image encoding device 100. The bitstream may include the compressed data of the down-sampled two-dimensional image and the information related to the down-sampling. Here, the information related to the down-sampling may include information related to the table 710, and thus the three-dimensional image decoding device 200 may generate an up-scaled patch 740 by up-scaling the down-sampled patch 730 according to the table 710. For example, the three-dimensional image decoding device 200 may index the points included in the down-sampled patch 730 such that the points are included in the up-scaled patch 740 that is enlarged to have a size two times larger than that of the down-sampled patch 730, based on size information of the table 710. The indexing of the points in the present disclosure is to arrange one point at one cell.

According to an embodiment of the present disclosure, because the points exist only at the cells with indices 0, 1, 2 and 5 in the down-sampled patch 730, the three-dimensional image decoding device 200 may index the points only into cells with indices 0, 2, 4, and 10 in the up-scaled patch 740. For example, the point at the cell with index 0 in the down-sampled patch 730 may be arranged newly at the cell with index 0 in the up-scaled patch 740.

According to an embodiment of the present disclosure, blocks 742 may have the same size as that of the table 710. In addition, the blocks 742 may serve as boundaries for dividing content of the up-scaled patch 740 to rearrange the points. As shown in FIG. 7, the three-dimensional image decoding device 200 may arrange each point of the down-sampled patch 730 into the left cell of each of the blocks 742. For example, the point at the cell with index 0 in the down-sampled patch 730 may be arranged into a left cell of a first 1×2 block from among the blocks 742, and the point at the cell with index 1 in the down-sampled patch 730 may be arranged into a left cell of a second 1×2 block from among the blocks 742. Furthermore, the point at the cell with index 2 in the down-sampled patch 730 may be arranged into a left cell of a third 1×2 block from among the blocks 742, and the point at the cell with index 5 in the down-sampled patch 730 may be arranged into a left cell of a sixth 1×2 block from among the blocks 742.

Hereinafter, a process of down-sampling and up-scaling a patch having a size of 1×12 points according to the predefined rule (or the table) 750 will be described with reference to FIG. 7. Similar to the down-sampling based on the table 710, the three-dimensional image encoding device 100 may down-sample the plurality of patches based on another table 750.

According to an embodiment of the present disclosure, the plurality of patches may be divided into blocks having a size of 1×3 points according to the table 750, and the point in a middle cell from among left, middle, and right cells in each block may be preserved. The patch 760 may be any one patch corresponding to the determined spatial area, from among the plurality of patches generated by the projection. The patch 760 may have a size of 1×12 points. Here, cells filled with their indices "0", "2", "3", "4", "7", "10", and "11" in the patch 760 may indicate the points included in the patch 760. Accordingly, in the down-sampling of the patch 760 according to the table 750, the patch 760 may be divided into four blocks and the point in the left cell in each block may be preserved. Because the points exist at the cells with indices 0, 2, 3, 4, 7, 10, and 11 in the patch 760, only the points at the cells with indices 0 and 3 in the patch 760 may be preserved after the down-sampling, according to the table 750.

In the down-sampling of the patch 760, the three-dimensional image encoding device 100 may generate a down-sampled patch 770, and may determine that points exist only at cells with indices 0 and 1 in the down-sampled patch 770. Here, because the down-sampled patch 770 is a result of the down-sampling of the patch 760, the down-sampled patch 770 may have a size of 1×4 points that is a third of the size of the patch 760. The three-dimensional image encoding device 100 may generate a down-sampled two-dimensional image by packing the down-sampled patch 770, and compress and output the generated two-dimensional image.

According to an embodiment of the present disclosure, the three-dimensional image decoding device 200 may receive information related to the table 750, and thus may generate an up-scaled patch 780 by up-scaling the down-sampled patch 770 according to the table 750. For example, the three-dimensional image decoding device 200 may index the points included in the down-sampled patch 770 such that the points are included in the up-scaled patch 780 that is enlarged to have a size three times larger than that of the down-sampled patch 770, based on size information of the table 750.

According to an embodiment of the present disclosure, blocks 782 may have the same size as that of the table 750. In addition, the blocks 782 may serve as boundaries for dividing content of the up-scaled patch 780 to rearrange the points.

As shown in FIG. 7, because the points exist only at the cells with indices 0 and 1 in the down-sampled patch 770, the three-dimensional image decoding device 200 may index the points only into cells with indices 0 and 3 in the up-scaled patch 780. For example, the three-dimensional image decoding device 200 may arrange each point of the down-sampled patch 770 into a left cell of each of the blocks 782. For example, the point at the cell with index 0 in the down-sampled patch 770 may be arranged into a left cell of a first 1×3 block from among the blocks 782, and the point at the cell with index 1 in the down-sampled patch 770 may be arranged into a left cell of a second 1×3 block from among the blocks 782.

Although FIG. 7 illustrates a case of down-sampling a one-dimensional patch in which points are arranged in a line, the present disclosure is not limited thereto. According to various embodiments of the present disclosure, the three-dimensional image encoding device 100 may down-sample the two-dimensional image based on a two-dimensional table. Hereinafter, a process of down-sampling a patch based on a predefined rule having a configuration of a two-dimensional table will be described with reference to FIG. 8.

Figure 8:
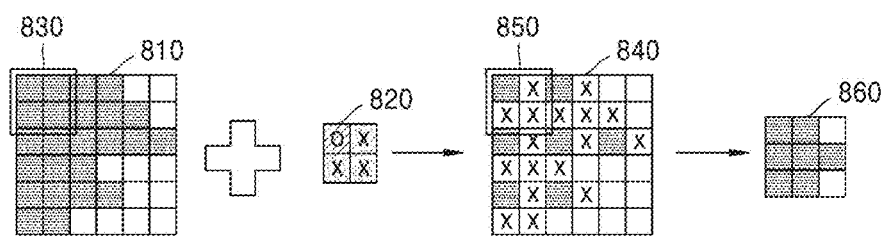
FIG. 8 is a diagram for explaining a process of down-sampling a patch based on a predefined rule having a configuration of a two-dimensional table, according to an embodiment of the present disclosure.

FIG. 8 is a diagram for explaining a process of down-sampling a patch based on a predefined rule having a configuration of a two-dimensional table, according to an embodiment of the present disclosure.

The patch 810 may be any one of the patches of the two-dimensional image 630 corresponding to the spatial area 620 determined by the three-dimensional image encoding device 100. Similar to the example illustrated in FIG. 7, the three-dimensional image encoding device 100 may down-sample the patch 810 based on the table 820.

According to an embodiment of the present disclosure, "0" in the table 820 may mean that a point at the corresponding cell is to be preserved, and "x" in the table 820 may mean that a point at the corresponding cell is not to be preserved. Accordingly, "x" in the patch 840 in which certain points are preserved may mean that a point does not exist at the corresponding cell. Here, the patch 840 in which certain points are preserved may refer to a result in which the certain points of the patch 810 are preserved.

According to an embodiment of the present disclosure, the table 820 may have a size of 2×2 points, and may indicate that a point at an upper left cell is to be preserved. Accordingly, the three-dimensional image encoding device 100 may divide, according to the table 820, the patch 810 into blocks 830 having a size of 2×2 points that is the same as the size of the table 820. In addition, the three-dimensional image encoding device 100 may divide the patch 810 into a plurality of blocks having the same size, and preserve only a point at the upper left cell of each block.

As shown in FIG. 8, the three-dimensional image encoding device 100 may generate the down-sampled patch 860 with certain points preserved. Here, the down-sampled patch 860 may have a configuration scaled down from the patch 810, including the preserved points.

Although FIG. 8 illustrates a process of down-sampling one patch, in general, one or more patches may be down-sampled.

Figure 9:
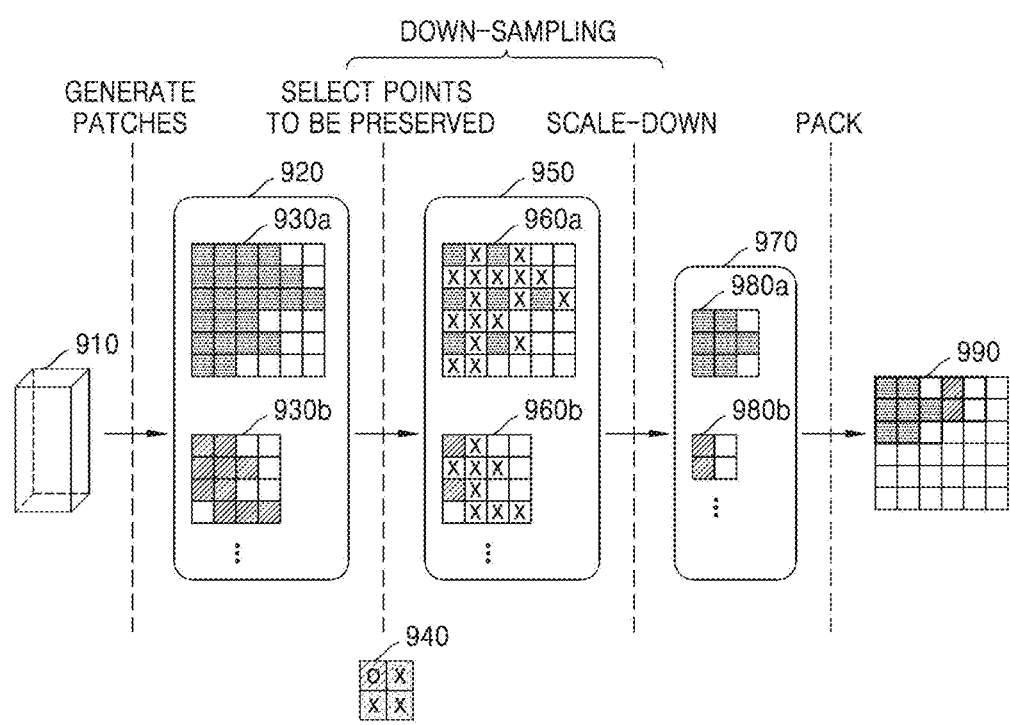
FIG. 9 is a diagram for explaining a process of converting a three-dimensional image into a two-dimensional image based on a predefined rule, according to an embodiment of the present disclosure.

FIG. 9 is a diagram for explaining a process of converting a three-dimensional image into a two-dimensional image based on a predefined rule, according to an embodiment of the present disclosure.

An object 910 may be in a three-dimensional space. The three-dimensional image encoding device 100 may generate a plurality of patches by projecting the object 910 onto a two-dimensional plane. The generation of the plurality of patches has been described with reference to FIGS. 3 and 4, and thus a detailed description thereof will be omitted.

Upon completion of the generation of the plurality of patches, the three-dimensional image encoding device 100 may down-sample patches 920 corresponding to the determined spatial area.

According to an embodiment of the present disclosure, a first patch 930a and a second patch 930b corresponding to the determined spatial area may be down-sampled. Specifically, the first patch 930a and the second patch 930b may be down-sampled according to the table 940.

The table 940 may have a size of 2×2 points, may indicate that a point at an upper left cell is to be preserved, and may correspond to the table 820 of FIG. 8. The first patch 930a and the second patch 930b may be down-sampled according to the table 940 in the same manner as the example illustrated in FIG. 8. Therefore, a detailed description of the down-sampling has been made with reference to FIG. 8, and thus will be omitted.

In the present disclosure, the patches 920 are described as being down-sampled according to one table 940, but the present disclosure is not limited thereto. Alternatively, the first patch 930a and the second patch 930b may be down-sampled according to different tables. For example, the first patch 930a may be down-sampled according to the table 940 and the second patch 930b may be down-sampled according to the table 710.

According to an embodiment of the present disclosure, when certain points are preserved according to the table 940, patches 950 in which the certain points are preserved may be generated. The patches 950 in which the certain points are preserved may refer to results in which the certain points of the patches 920 are preserved. For example, a first patch 960a in which certain points are preserved and a second patch 960b in which certain points are preserved may refer to results obtained by preserving the certain points from the first patch 930a and the second patch 930b, respectively. For example, the first patch 960a may be generated by preserving the certain points from the first patch 930a, and the second patch 960b may be generated by preserving the certain points from the second patch 930b.

As shown in FIG. 9, the three-dimensional image encoding device 100 may generate down-sampled patches 970 with the certain points preserved. Here, the down-sampled patches 970 may have configurations scaled down from the patches 920, including the preserved points. For example, a first down-sampled patch 980a may be generated by down-sampling the first patch 930a, and a second down-sampled patch 980b may be generated by down-sampling the second patch 930b. Upon completion of the generation of the down-sampled patches 970, the three-dimensional image encoding device 100 may generate a two-dimensional image 990 by packing the down-sampled patches 970 and a plurality of patches of the two-dimensional image corresponding to the remaining areas other than the determined spatial area of the object 910. Here, the three-dimensional image encoding device 100 may generate the two-dimensional image 990 by classifying high-similarity patches, and collecting and packing the classified patches.

According to an embodiment of the present disclosure, the generated two-dimensional image 990 may be compressed by using a conventional video compression scheme, may be included in the bitstream together with the information related to the down-sampling, and may be transmitted to the three-dimensional image decoding device 200.

The information related to the down-sampling may include at least one of the size of the blocks into which the patch is divided, information about the table 940, and position information about each of the down-sampled patches 970 in the two-dimensional image 990. Accordingly, the three-dimensional image decoding device 200 may identify the down-sampled patches 970 based on the position information of each of the down-sampled patches 970. Upon reception of the size of the blocks into which the patch is divided, the three-dimensional image decoding device 200 may perform up-scaling based on a down-sampling ratio corresponding to the size of the blocks. According to another embodiment of the present disclosure, upon reception of the information about the table, the three-dimensional image decoding device 200 may perform the up-scaling by rearranging the points in positions marked on the table.

Figure 10:
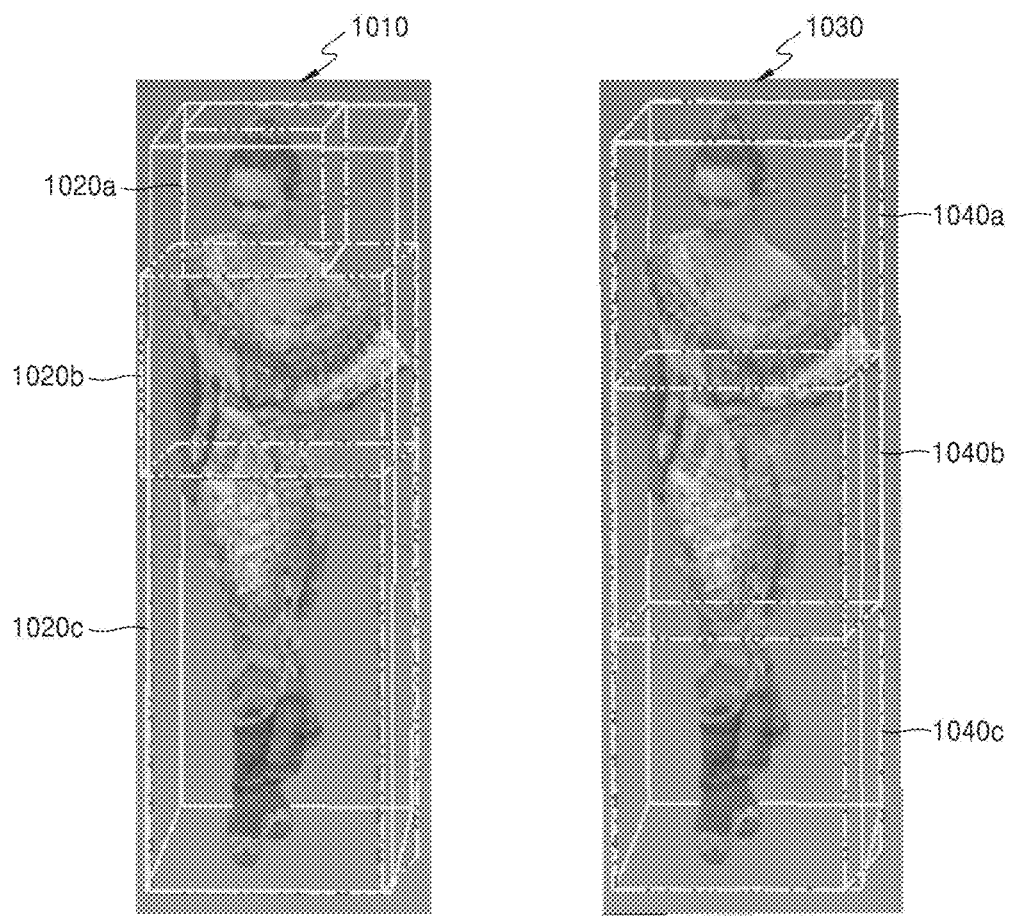
FIG. 10 is a diagram of an example of determining a spatial area in a three-dimensional space, according to an embodiment of the present disclosure.

FIG. 10 is a diagram of an example of determining a spatial area in a three-dimensional space, according to an embodiment of the present disclosure.

According to an embodiment of the present disclosure, the three-dimensional image encoding device 100 may determine the spatial area for down-sampling to be at least one of a first area 1020a, a second area 1020b, or a third area 1020c in a three-dimensional image 1010, according to the user's selection or by itself. Here, the determined spatial area of the three-dimensional image 1010 may not have a fixed size. Accordingly, a size and a volume of the determined spatial area may be adjusted. For example, when at least one of the first area 1020a, the second area 1020b, or the third area 1020c is determined as the spatial area for down-sampling, the user may adjust the size of the determined spatial area. According to another embodiment of the present disclosure, the user may adjust a position of the determined spatial area on the three-dimensional image 1010.

According to another embodiment of the present disclosure, the three-dimensional image encoding device 100 may divide an entire area of a three-dimensional image 1030 into areas having the same size, and determine the spatial area for down-sampling to be a certain are 1040*a* among areas 1040*a*, 1040*b*, and 1040*c*. In this case, the determined spatial area may have a fixed size.

When the spatial area of the three-dimensional image is determined, the three-dimensional image encoding device 100 may generate a manifest describing the determined spatial area, include the manifest in the bitstream, and transmit the bitstream.

FIGS. 11A, 11B, 11C and 11D are diagrams of parts of examples of a manifest, according to an embodiment of the present disclosure.

The manifest may be a document including information necessary for the three-dimensional image decoding device 200 to decode the three-dimensional image. For example, the manifest may describe the spatial area determined by the three-dimensional image encoding device 100. Also, the three-dimensional image decoding device 200 may display the determined spatial area of the three-dimensional image to the user, based on information in the manifest.

A method of representing the determined spatial area may be described in the manifest, and thus information about the point cloud of the determined spatial area may be transmitted to the three-dimensional image decoding device 200 by using the manifest.

Because the determined spatial area is a three-dimensional spatial area, the determined spatial area may be represented by using three-dimensional coordinates, rather than two-dimensional coordinates used for transmitting a two-dimensional image. For example, a representative position of the spatial area may be represented in three dimensions (e.g., x, y, and z), and the size of the spatial area may be represented in three dimensions (e.g., width, height, and depth).

FIGS. 11A, 11B, 11C and 11D illustrate examples of the manifest, which are generated in a format and a structure of an MPEG-DASH media presentation description (MPD) file. Also, the manifests illustrated in FIGS. 11A and 11B may be obtained by encoding information for representing the spatial area according to other conditions (e.g., a network bandwidth, a resolution, a compression scheme, etc.) and writing the encoded information in representation units. However, the manifest is not limited thereto, and other technologies of bitrate-based multimedia presentation may be applied.

The manifest according to an embodiment of the present disclosure may be included in the bitstream to be output by the three-dimensional image encoding device 100. However, the three-dimensional image encoding device 100 may include the information describing the spatial area in the auxiliary data to be output in the bitstream, without generating a separate manifest.

Figure 12:
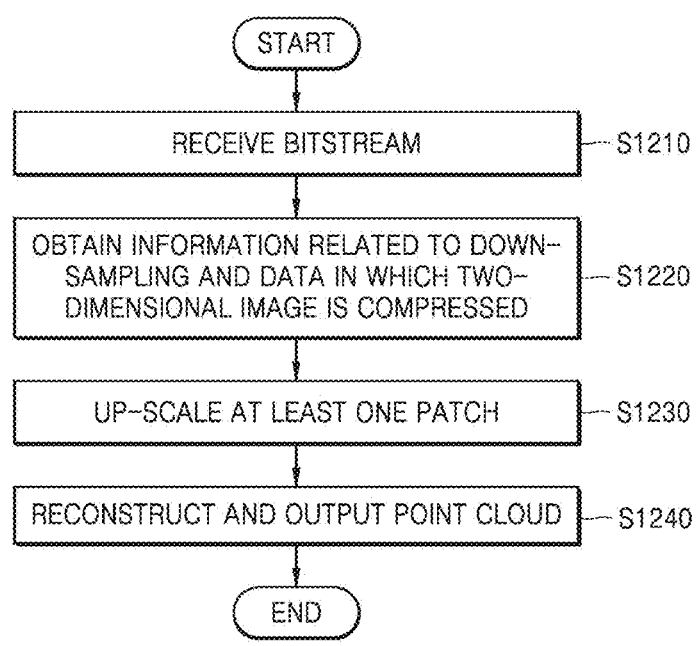
FIG. 12 is a flowchart of a method of decoding a three-dimensional image, according to an embodiment.

FIG. 12 is a flowchart of a method of decoding a three-dimensional image, according to an embodiment.

In operation S1210, the three-dimensional image decoding device 200 may receive and parse the bitstream from the three-dimensional image encoding device 100.

Next, in operation S1220, the three-dimensional image decoding device 200 may parse the bitstream to obtain the information related to the down-sampling and data in which the two-dimensional image is compressed. Then, the three-dimensional image decoding device 200 may obtain the two-dimensional image by decoding using a conventional video compression scheme (e.g., HEVC), and may up-scale at least one patch based on the information related to the down-sampling.

In operation S1230, the three-dimensional image decoding device 200 may up-scale the at least one patch included in the two-dimensional image, based on the information related to the down-sampling. The up-scaling will be described in detail with reference to FIG. 13.

According to an embodiment of the present disclosure, the two-dimensional image may have been generated by packing a plurality of down-sampled patches, after the down-sampling, by the three-dimensional image encoding device 100. In addition, the bitstream may include at least one of the preset ratio, the predefined rule, or the position information of the at least one down-sampled patch in the two-dimensional image. Because the at least one patch is down-sampled according to the table, the three-dimensional image encoding device 100 may transmit information about the size of the blocks corresponding to the size of the table, rather than the information about the table. Accordingly, the preset ratio received by the three-dimensional image decoding device 200 may correspond to the size of the blocks transmitted by the three-dimensional image encoding device 100. For example, when the size of the blocks transmitted by the three-dimensional image encoding device 100 is 2×2, the preset ratio may indicate that the down-sampled block is to be enlarged twice horizontally and vertically in the up-scaling, and when the size of the blocks is 1×2, the preset ratio may indicate that the down-sampled block is to be enlarged twice horizontally in the up-scaling.

Throughout the present disclosure, the up-scaling is a concept opposite to the down-sampling, and the three-dimensional image decoding device 200 may perform the up-scaling by indexing the points included in the down-sampled patch, into a patch that is enlarged at the preset ratio. Here, the three-dimensional image decoding device 200 may perform the indexing based on the information related to the down-sampling.

According to an embodiment of the present disclosure, when the three-dimensional image decoding device 200 is aware of the preset ratio or the three-dimensional image encoding device 100 has transmitted, to the three-dimensional image decoding device 200, the size of the blocks corresponding to the size of the table and the position information of the at least one down-sampled patch, the three-dimensional image decoding device 200 may perform the up-scaling based only on the position information of the down-sampled patch in the two-dimensional image. In this case, the points of the patch may not have constant positions into which they are to be indexed. For example, when the up-scaling is performed according to the preset ratio, although the table 940 of FIG. 9 is determined to preserve only the point at the upper left cell of each block, a position into which a point is to be indexed may be an upper right cell, a lower left cell, or a lower right cell. In addition, the patch enlarged at the preset ratio may be divided into areas for indexing by the blocks having the same size, and the positions of the points in the block of each area may be different from each other.

According to another embodiment of the present disclosure, when the bitstream includes the information about the table and the position information of the down-sampled patch in the two-dimensional image, the three-dimensional image decoding device 200 may perform the up-scaling based on information about the positions from which the points are preserved (e.g., the upper left cell), the size information of the table, and the position information of the down-sampled patch in the two-dimensional image.

Upon completion of the up-scaling of the two-dimensional image, in operation S1240, the three-dimensional image decoding device 200 may reconstruct the point cloud by restoring the color information and the position information of the points based on the up-scaled two-dimensional image.

According to an embodiment of the present disclosure, the three-dimensional decoding device 200 may receive the compressed data of the two-dimensional image transmitted by the three-dimensional encoding device 100, and thus the two-dimensional image obtained by decoding may be a geometry image or a texture image. The geometry image may refer to the position information of the plurality of points included in the point cloud, and the texture image may refer to the color information of the plurality of points included in the point cloud.

Throughout the present disclosure, the geometry image may refer to the position information of the plurality of points included in the point cloud, and the texture image may refer to the color information of the plurality of points included in the point cloud. Accordingly, the three-dimensional image decoding device 200 may reconstruct the point cloud by restoring the position information of the points based on an up-scaled geometry image, and restoring the color information of the points with the restored position information, based on an up-scaled texture image.

Upon completion of the reconstruction of the point cloud, the three-dimensional image decoding device 200 may generate the three-dimensional image from the reconstructed point cloud and display the three-dimensional image to the user. In this case, a down-sampled point cloud may be in a state in which the plurality of points do not exist, as compared to an original image.

When the three-dimensional image is displayed to the user, the user may reselect the three-dimensional spatial area for down-sampling, if necessary. When the user selects the spatial area, the three-dimensional image decoding device 200 may receive a user input and transmit information related to the user input to the three-dimensional image encoding device 100.

Figure 13:
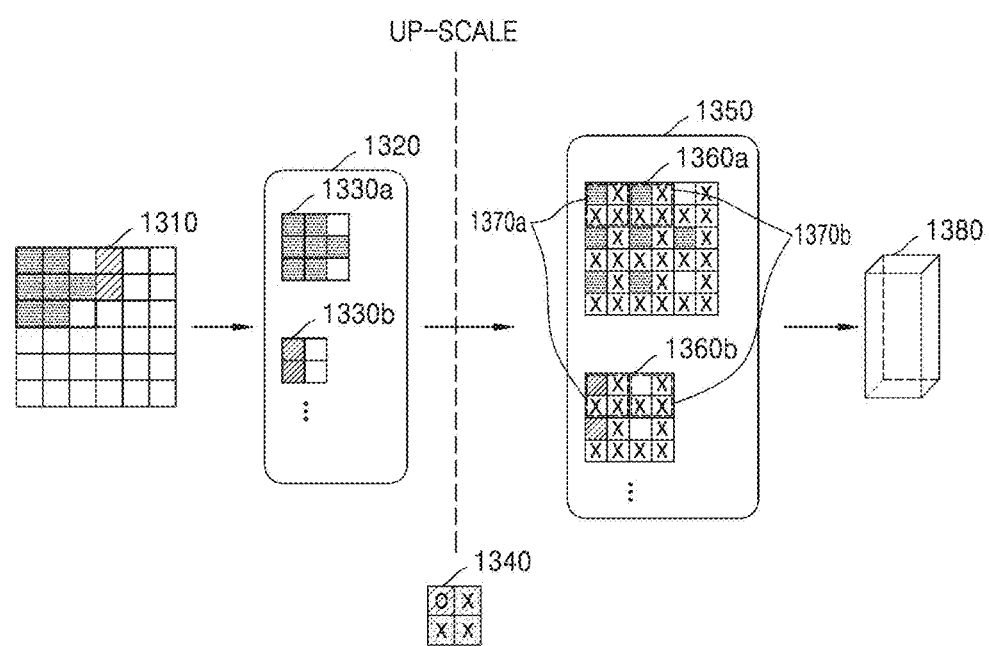
FIG. 13 is a diagram for explaining a process of converting a two-dimensional image into a three-dimensional image, according to an embodiment of the present disclosure.

FIG. 13 is a diagram for explaining a process of converting a two-dimensional image into a three-dimensional image, according to an embodiment of the present disclosure.

According to an embodiment of the present disclosure, a two-dimensional image 1310 may correspond to the two-dimensional image 990 of FIG. 9. The three-dimensional image decoding device 200 may up-scale at least one down-sampled patch included in the two-dimensional image 1310 based on the information related to the down-sampling from the bitstream.

According to an embodiment of the present disclosure, the bitstream may include information about the table 1340 used in the down-sampling and the position information of the down-sampled patch in the two-dimensional image 1310. Accordingly, the three-dimensional image decoding device 200 may determine down-sampled patches 1320 from among a plurality of patches in the two-dimensional image 1310 based on the position information of at least one down-sampled patch. Then, the down-sampled patches 1320 may be up-scaled to generate up-sampled patches 1350.

According to an embodiment of the present disclosure, the three-dimensional image decoding device 200 may determine that a first down-sampled patch 1330a and a second down-sampled patch 1330b are down-sampled patches, from among the plurality of patches included in the two-dimensional image 1310. In addition, the three-dimensional image decoding device 200 may up-scale the first down-sampled patch 1330a and the second down-sampled patch 1330b according to the table 1340.

The up-scaling illustrated in FIG. 13 may be a concept opposite to the down-sampling illustrated in FIG. 9. Thus, the first down-sampled patch 1330a, the second down-sampled patch 1330b, and the table 1340 may correspond to the first down-sampled patch 980a, the second down-sampled patch 980b, and the table 940, respectively.

The three-dimensional image decoding device 200 may determine to enlarge the first down-sampled patch 1330a and the second down-sampled patch 1330b twice horizontally and vertically based on the information about the table 1340.

According to an embodiment of the present disclosure, similar to the blocks 742 of FIG. 7, blocks 1370a and 1370b may serve as boundaries for dividing content of the up-scaled patches 1350 to rearrange the points. In addition, the blocks 1370a and 1370b may have a size of 2×2 points, that is the same as the size of the table 1340. The three-dimensional image decoding device 200 may determine to index each point of the first down-sampled patch 1330a and the second down-sampled patch 1330b into the up-scaled patches.

Similar to the up-scaling illustrated in FIG. 7, the three-dimensional image decoding device 200 may divide a first up-scaled patch 1360a into blocks (not shown) having the same size as that of the blocks 1370a and 1370b, and arrange each of the points of the first down-sampled patch 1330a into an upper left cell of each block. In this case, each point of the first down-sampled patch 1330a and each divided area in the first up-scaled patch 1360a may have the same relative position in each patch. For example, the three-dimensional image decoding device 200 may arrange a point at a leftmost and uppermost cell in the first down-sampled patch 1330a, into an upper left cell in the block 1370a at a leftmost and uppermost position from among the blocks having a size of 2×2 points in the first up-scaled patch 1360a. Furthermore, the three-dimensional image decoding device 200 may arrange a point at an upper middle cell in the first down-sampled patch 1330a, into an upper middle cell in the block 1370a at an upper middle position from among the blocks having a size of 2×2 points in the first up-scaled patch 1360a.

The second down-sampled patch 1330b may be up-scaled in the same manner as the up-scaling of the first down-sampled patch 1330a, and thus a second up-scaled patch 1360b may be generated.

According to an embodiment of the present disclosure, the up-sampled patches 1350 may include a geometry image and a texture image. Accordingly, upon completion of the generation of the up-scaled patches 1350 by up-scaling the down-sampled patches 1320, the three-dimensional image decoding device 200 may reconstruct the point cloud by restoring the position information of the points based on an up-scaled geometry image, and restoring the color information of the points with the restored position information, based on an up-scaled texture image. Then, the three-dimensional image decoding device 200 may generate an object 1380 that is a three-dimensional image, based on the point cloud.

Figure 14:
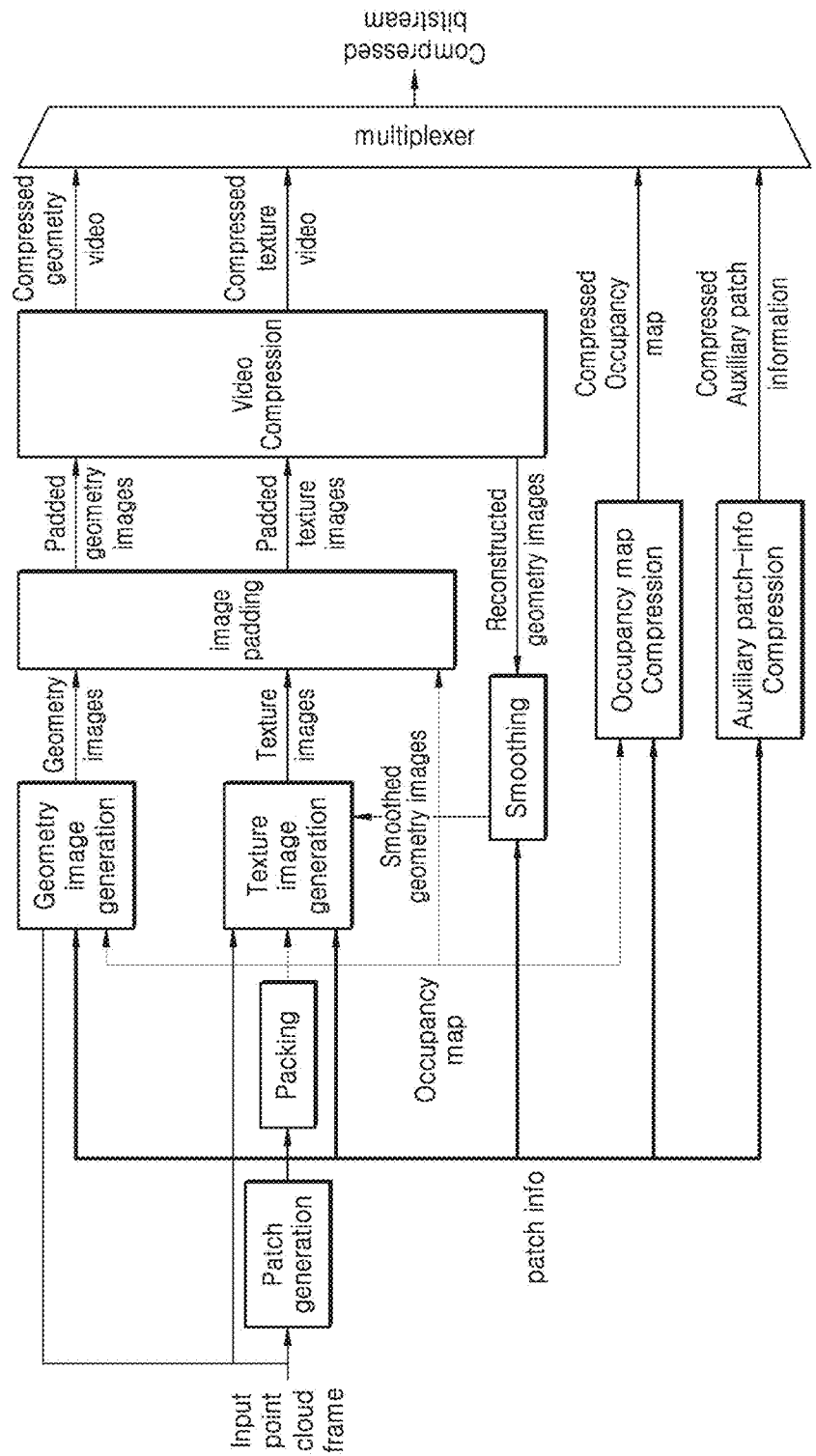
FIG. 14 is a diagram of a structure of a processor of FIG. 1, according to an embodiment of the present disclosure.

FIG. 14 is a diagram of a structure of the processor 110 of FIG. 1, according to an embodiment of the present disclosure.

Some or all blocks illustrated in FIG. 14 may be implemented by hardware and/or software components that execute specific functions. The functions performed by the blocks illustrated in FIG. 14 may be implemented by at least one microprocessor included in an electronic device or by circuit components for the corresponding functions. Some or all blocks illustrated in FIG. 14 may be software modules configured in various programming languages or script languages executable in the processor.

According to an embodiment of the present disclosure, a patch generation block of FIG. 14 may project points included in a three-dimensional image onto a two-dimensional plane. The patch generation block may group the points included in the three-dimensional image into a plurality of segments, and may project the segments onto the two-dimensional plane. Accordingly, the patch generation block may generate a plurality of patches by projecting each of the plurality of segments onto at least one two-dimensional plane. The patch generation block may also down-sample the plurality of patches by performing the down-sampling according to various embodiments of the present disclosure. According to an embodiment of the present disclosure, the patch generation block may generate an occupancy map image, and the occupancy map image may indicate information about pixels having information about the point cloud, from among pixels of a geometry image and a texture image.

According to an embodiment of the present disclosure, a packing block may pack the plurality of patches generated.

According to an embodiment of the present disclosure, a texture image generation block, a geometry image generation block, an occupancy map compression block, and an auxiliary patch-info compression block may generate a texture image (or a color information image), a geometry image (or a position information image), an encoded occupancy map, and an encoded auxiliary patch information, respectively. The auxiliary patch information may include auxiliary information such as size information of the three-dimensional image.

An image padding block may perform image padding that fills an empty portion with information, in the texture image and the geometry image. The image padding block may perform dilation on the texture image and the geometry image so as to improve a compression performance by removing a discontinuity between patches. In addition, the image padding block may perform the image padding on the geometry image and the texture image, based on the occupancy map filtered by the occupancy map compression block.

According to an embodiment of the present disclosure, a video compression block may compress information about the two-dimensional image (the texture image and the geometry image) generated by processing three-dimensional image data, and may encode the compressed information about the two-dimensional image.

When restoring the two-dimensional image that has been compressed, a significant distortion may occur at boundaries of each patch, and thus the three-dimensional image may be improperly reconstructed. According to an embodiment of the present disclosure, a smoothing block may adjust point values of the two-dimensional image such that points at the boundaries of each patch are connected to each other smoothly in the three-dimensional space.

A multiplexer block may generate and output the bitstream based on the encoded geometry image, the texture image, the occupancy map, and the auxiliary information.

As described above, the point cloud is composed of data representing positions and colors of some points in a three-dimensional space. Accordingly, geometry information and color information of the point cloud are recorded only on some points of the two-dimensional image generated by projecting the points of the point cloud onto the two-dimensional plane.

Figure 15:
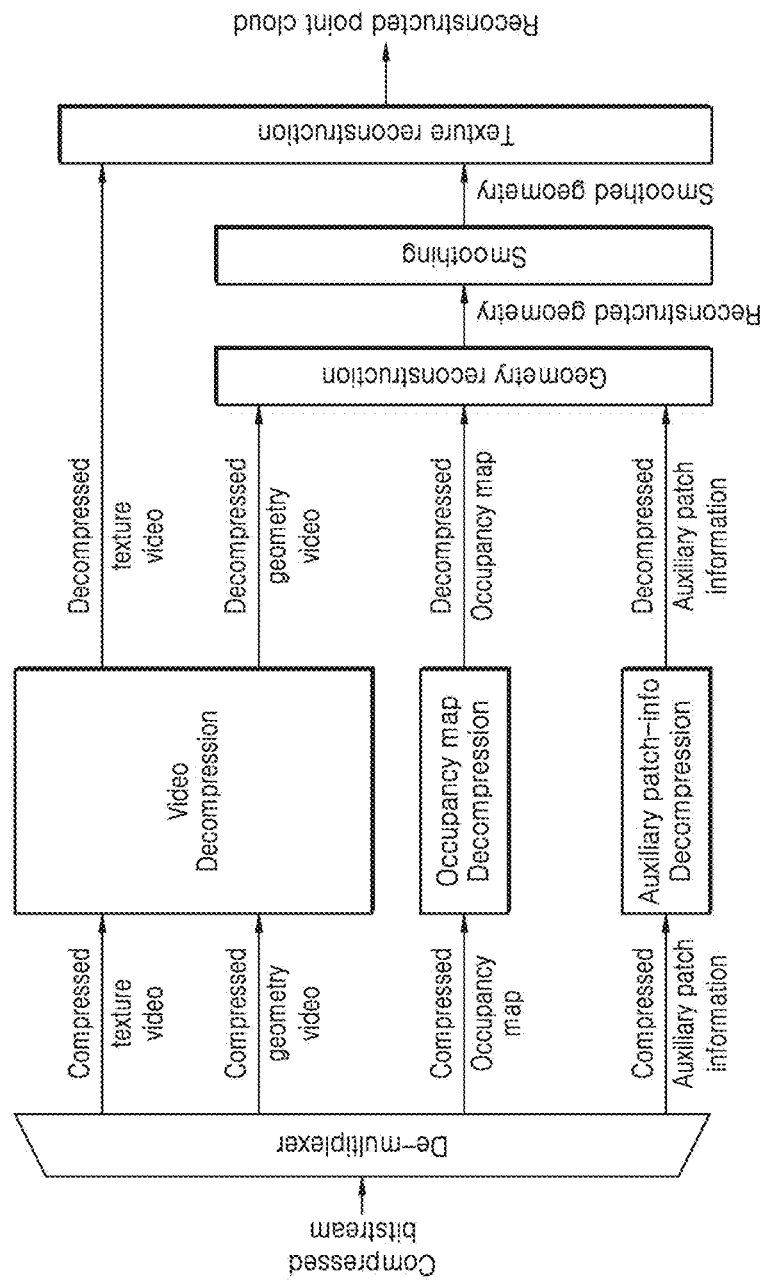
FIG. 15 is a diagram of a structure of a processor of FIG. 2, according to an embodiment of the present disclosure.

FIG. 15 is a diagram of a structure of the processor 220 of FIG. 2, according to an embodiment of the present disclosure.

Some or all blocks illustrated in FIG. 15 may be implemented by hardware and/or software components that execute specific functions. The functions performed by the blocks illustrated in FIG. 15 may be implemented by at least one microprocessor included in an electronic device or by circuit components for the corresponding functions. Some or all blocks illustrated in FIG. 14 may be software modules configured in various programming languages or script languages executable in the processor.

According to an embodiment of the present disclosure, a de-multiplexer block of FIG. 15 may receive the bitstream, and may separate the texture image, the geometry image, a compressed occupancy map, and compressed auxiliary patch information from the bitstream. The auxiliary patch information may include information about filtering performed by the three-dimensional image encoding device, on the occupancy map.

A video decompression block may decompress compressed information. Specifically, the video decompression block may decompress a compressed geometry image and a compressed texture image.

A geometry reconstruction block may reconstruct geometry information of points based on a decompressed geometry image, a decompressed occupancy map, and decompressed auxiliary patch information, thereby generating geometry data of the point cloud. The geometry reconstruction block may also generate an up-scaled geometry image by performing the up-scaling according to various embodiments of the present disclosure. Accordingly, the geometry reconstruction block may reconstruct the position information of the points of the point cloud based on the geometry image, the occupancy map, and the auxiliary patch information.

A smoothing block of FIG. 15 may adjust point values at boundaries of the two-dimensional image such that points at boundaries of a reconstructed geometry image are connected to each other smoothly in the three-dimensional space.

A texture reconstruction block may generate an up-scaled texture image from the decompressed texture image. The texture reconstruction block may also generate and output the point cloud based on the geometry data of the point cloud that has undergone a smoothing process and the up-scaled texture image. The texture reconstruction block may reconstruct the three-dimensional image by restoring the color information of the points having the restored position information.

Various embodiments of the present disclosure may be implemented as a software (S/W) program including an instruction stored in a computer-readable storage media.

The computer may invoke stored instructions from the storage medium and operate based on the invoked instructions according to the disclosed embodiment, and may include a device according to the disclosed embodiments.

The computer-readable storage medium may be provided in the form of a non-transitory storage medium. Here, the term "non-transitory" simply means that the storage medium is a tangible device, and does not include a signal, but this term does not differentiate between where data is semi-permanently stored in the storage medium and where the data is temporarily stored in the storage medium.

The electronic device or the method according to the embodiments of the present disclosure may be included and provided in a computer program product. The computer program product may be traded as a product between a seller and a buyer.

The computer program product may include a software (S/W) program and a computer-readable recording medium in which the S/W program is stored. For example, the computer program product may include a product (e.g., a downloadable application) in the form of an S/W program electronically distributed through a manufacturer or the electronic device or an electronic market (e.g., Google Play Store, App Store). For the electronic distribution, at least a portion of the S/W program may be stored in a storage medium or temporarily generated. In this case, the storage medium may be a storage medium of a server in the manufacturer or the electronic market or a relay server that temporarily stores the S/W program.

The computer program product may include a storage medium of a server or a storage medium of a terminal, in a system including the server and the terminal (e.g., a terminal device or a remote control device). Alternatively, when there is a third device (e.g., a smart phone) communicating with the server or the terminal, the computer program product may include a storage medium of the third device. Alternatively, the computer program product may include an S/W program itself, which is transmitted from the server to the terminal or the third device or transmitted from the third device to the terminal. In this case, one of the server, the terminal, and the third device may execute the computer program product to perform the method according to the embodiments of the disclosure. Alternatively, two or more of the server, the terminal, and the third device may execute the computer program product to execute the method according to the embodiments of the present disclosure in a distributed manner.

For example, a server (e.g., a cloud server or an artificial intelligence server, etc.) may execute a computer program product stored in the server to control the terminal communicating with the server to perform the method according to the embodiments of the present disclosure.

In another example, the third device may execute the computer program product to control the terminal communicated with the third device to perform the method according to the disclosed embodiments. More specifically, the third device may remotely control the terminal device or the remote control device to transmit or receive a packing image.

When the third device executes the computer program product, the third device may download the computer program product and execute the downloaded computer program product. Alternatively, the third device may execute a computer program product provided in a preloaded state to execute the method according to the disclosed embodiments.

The embodiments of the present disclosure have been described with reference to the accompanying drawings. It will be understood by one of skill in the art that various changes in form and details may be made therein without departing from the spirit and essential features of the present disclosure. The disclosed embodiments should be considered in descriptive sense only and not for purposes of limitation.

The invention claimed is:

1. A method of encoding a three-dimensional image including a point cloud, the method comprising:
   determining a spatial area in a three-dimensional space represented by the point cloud;
   projecting, onto a two-dimensional plane, a plurality of points included in the point cloud to generate a plurality of patches;
   determining at least one patch corresponding to the determined spatial area;
   down-sampling at least one patch according to a predefined rule;
   generating a two-dimensional image by packing the at least one down-sampled patch and the plurality of patches corresponding to areas other than the determined spatial area; and
   generating and outputting a bitstream including data in which the two-dimensional image is compressed and information related to the down-sampling performed to generate the two-dimensional image,
   wherein the predefined rule is a table indicating a size of blocks into which the at least one patch is divided and indicating a predefined position at which a point is preserved from the blocks.

2. The method of claim 1, wherein the determining of the spatial area includes receiving a user input for selecting the spatial area in the three-dimensional space.

3. The method of claim 1, wherein a size of the determined spatial area is fixed or adjustable.

4. The method of claim 1, wherein the generating of the plurality of patches includes:
   grouping the plurality of points included in the point cloud into a plurality of segments; and
   generating the plurality of patches by projecting points included in the plurality of segments, onto the two-dimensional plane.

5. The method of claim 1, wherein the down-sampling of the at least one patch includes dividing the at least one patch into blocks having a preset size, and, when a point exists at a predefined position in each block, preserving the point, to perform down-sampling.

6. The method of claim 1, wherein the information related to the down-sampling performed to generate the two-dimensional image includes at least one of a size of blocks into which the at least one patch is divided, the predefined rule, or position information of the at least one down-sampled patch in the two-dimensional image.

7. The method of claim 1, wherein the two-dimensional image includes a geometry image representing depth values of points and a texture image representing color values of the points.

8. The method of claim 1, wherein the bitstream includes information about a geometry image, a texture image, an occupancy map, and auxiliary data, and the information related to the down-sampling is included in the auxiliary data.

9. The method of claim 1, further comprising generating a manifest describing the determined spatial area,
   wherein the bitstream further includes data related to the manifest.

10. A method of decoding a three-dimensional image including a point cloud, the method comprising:
    receiving a bitstream;
    obtaining, from the bitstream, information related to down-sampling and data in which a two-dimensional image is compressed;

up-scaling at least one down-sampled patch included in the two-dimensional image, based on the information related to the down-sampling; and reconstructing the point cloud by restoring color information and position information of points, based on the up-scaled at least one down-sampled patch included in the two-dimensional image, wherein the information related to the down-sampling includes a predefined rule, and wherein the predefined rule is a table indicating a size of blocks into which the at least one patch is divided and indicating a predefined position at which a point is preserved from the blocks.

11. The method of claim 10, wherein the up-scaling includes indexing points included in the at least one down-sampled patch, into at least one patch that is enlarged at a preset ratio.

12. The method of claim 10, wherein the two-dimensional image includes a geometry image representing depth values of points and a texture image representing color values of the points.

13. The method of claim 10, wherein the reconstructing of the point cloud includes reconstructing the point cloud by restoring position information of points based on an up-scaled geometry image, and restoring color information of the points having the restored position information, based on an up-scaled texture image.

14. The method of claim 10, further comprising generating a three-dimensional image from the reconstructed point cloud, and displaying the generated three-dimensional image.

15. The method of claim 14, further comprising receiving a user input for selecting a spatial area in the displayed three-dimensional image, and transmitting the user input.

16. A device for decoding a three-dimensional image including a point cloud, the device comprising:

a receiver configured to receive a bitstream; and at least one processor configured to:

obtain, from the bitstream, information related to down-sampling and data in which a two-dimensional image is compressed, up-scale at least one down-sampled patch included in the two-dimensional image based on the information related to the down-sampling, and reconstruct the point cloud by restoring color information and position information of points based on the up-scaled two-dimensional image, wherein the information related to the down-sampling includes a predefined rule, and wherein the predefined rule is a table indicating a size of blocks into which the at least one patch is divided and indicating a predefined position at which a point is preserved from the blocks.

* * * * *